United States Patent
Schulz

(10) Patent No.: US 9,891,802 B2
(45) Date of Patent: Feb. 13, 2018

(54) CHECKBOX MASS EDITING

(71) Applicant: SNOWFLAKE COMPUTING, INC., San Mateo, CA (US)

(72) Inventor: Egan Schulz, San Jose, CA (US)

(73) Assignee: Snowflake Computing, Inc., San Mateo, CA (US)

( * ) Notice: Subject to any disclaimer, the term of this patent is extended or adjusted under 35 U.S.C. 154(b) by 220 days.

(21) Appl. No.: 14/444,287

(22) Filed: Jul. 28, 2014

(65) Prior Publication Data

US 2016/0026374 A1 Jan. 28, 2016

(51) Int. Cl.
G06F 17/00 (2006.01)
G06F 3/0484 (2013.01)
G06F 17/24 (2006.01)

(52) U.S. Cl.
CPC ........ G06F 3/04847 (2013.01); G06F 17/245 (2013.01); G06F 17/246 (2013.01)

(58) Field of Classification Search
CPC .............................. G06F 17/245; G06F 17/246
See application file for complete search history.

(56) References Cited

U.S. PATENT DOCUMENTS

| | | | | |
|---|---|---|---|---|
| 6,734,883 B1* | 5/2004 | Wynn | ................... | G06F 3/0482 715/808 |
| 7,091,959 B1* | 8/2006 | Clary | ................. | G06F 3/03545 345/173 |
| 7,207,009 B1* | 4/2007 | Aamodt | ................ | G06Q 10/06 715/772 |
| 2004/0111673 A1* | 6/2004 | Bowman | ............... | G06F 9/4443 715/234 |
| 2004/0207658 A1* | 10/2004 | Awada | .................. | G06F 9/4443 715/747 |
| 2006/0097987 A1* | 5/2006 | Hughes | ................... | G06F 3/038 345/156 |
| 2010/0005391 A1* | 1/2010 | Fukuda | .................... | G06F 21/36 715/708 |
| 2011/0018896 A1* | 1/2011 | Buzyn | .................... | G06F 3/0481 345/594 |
| 2011/0191343 A1* | 8/2011 | Heaton | ............... | G06F 19/3443 707/737 |
| 2012/0330709 A1* | 12/2012 | Khorsheed | ....... | G06Q 10/06311 705/7.15 |
| 2013/0179896 A1* | 7/2013 | Kalaidjian | ............ | G06F 9/4843 718/107 |
| 2013/0290925 A1* | 10/2013 | Shankar | .................... | G06F 8/10 717/105 |
| 2015/0205515 A1* | 7/2015 | Eldawy | ................. | G06F 3/0488 715/760 |

* cited by examiner

Primary Examiner — Stephen Hong
Assistant Examiner — Gregory Vaughn
(74) Attorney, Agent, or Firm — Haynes and Boone, LLP

(57) ABSTRACT

Methods and systems for selecting multiple rows, columns, and/or cells are described. A user opens or otherwise accesses a file or document containing multiple rows, columns, and/or cells. The user hover a cursor or pointer over a particular row, column, or cell, or the user touches a particular row, column, or cell on a touchscreen. A single checkbox appears for that particular row, column, or cell. When the user selects that checkbox, unselected checkboxes for the other rows, columns, or cells appear. From there, the user can choose to select all the checkboxes or just some of the checkboxes to perform a mass action on the selected rows, columns, or cells.

20 Claims, 6 Drawing Sheets

CHECKBOX MASS EDITING

BACKGROUND

Field of the Invention

The present invention generally relates to the selection of multiple rows, columns, and/or cells for performing a mass command on all the selected rows, columns, and/or cells.

Related Art

Many software applications present tables of data or information to a user through a graphical user interface. In some cases, these tables may contain information that may be read only, and in other cases a software application may allow a user to select data and modify the data in the table. For example, the application may allow a user to add, delete, select, and update rows of stored data. Typically, the application provides checkboxes next to each row so that a user can check or uncheck boxes to indicate which rows the user wants to manipulate. A long column of empty checkboxes on the user interface, however, can be distracting to a user and clutter the user interface.

Thus, a need exists for systems and methods that allow a user to select multiple checkboxes on a cleaner user interface.

Figure 1:
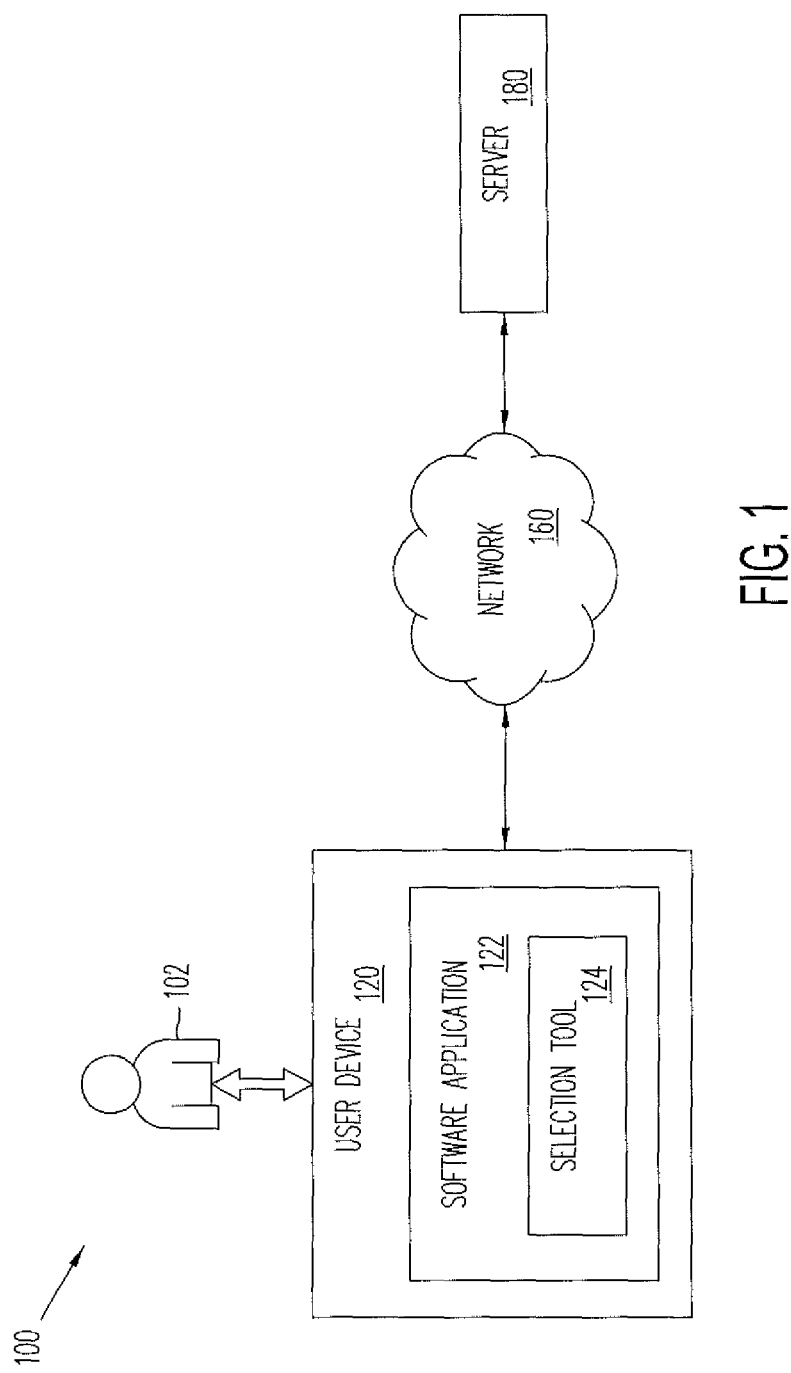
FIG. 1 is a block diagram illustrating a system for the selection of multiple rows, columns, and/or cells according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that present checkboxes for multiple row, column, and/or cell selection upon receipt of user input. The typical use of checkboxes is to allow users to select multiple items in a list. Checkboxes allow a user to toggle between two possible choices, and work like an on/off switch.

In an exemplary embodiment, a user moves or hovers his or her cursor or pointer over a particular row. A single checkbox appears for that particular row. When the user selects that single checkbox, the unselected checkboxes for the other rows appear. From there, the user can choose to select all the checkboxes or just some of the checkboxes to perform a mass action on the selected rows. Multiple rows may be batch edited at one time by selecting the desired rows, making the change, and applying the change to the selected rows.

In some embodiments, after the user selects multiple rows, he or she may choose to select multiple columns and/or cells. For example, before the user performs a mass action on the selected rows, he or she may hover the cursor over a particular column so that a single checkbox appears for the column. When that checkbox is selected, unselected checkboxes for other columns appear that the user can select. The user can then select columns to perform the mass action on. The mass action can then be performed on both the selected rows and columns.

FIG. 1 shows one embodiment of a block diagram of a network-based system 100 adapted for the selection of multiple rows, columns, and/or cells with a user device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a computer) and at least one server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 120, in one embodiment, may be utilized by the user 102 to interact with the server 180 over the network 160. In various implementations, the user device 120 includes a wireless telephone (e.g., cellular or mobile phone), a tablet, a personal computer, a notebook computer, a wearable computing device, and/or various other generally known types of wired and/or wireless computing devices.

The user device 120 includes a software application 122 that includes a selection tool 124. The selection tool 124 may consist of one or more software applications, programs, modules, procedures, or other computer code to include firmware and may additionally include stored data that may be part of the software application 122 (not shown), where it modifies the presentation of the graphical user interface to implement the row, column, and/or cell selection functionality described herein. In the embodiment shown in FIG. 1, the selection tool 124 is part of the software application 122 and resides on server 180. In other embodiments, the software application 122 and/or the selection tool 124 may reside on one or more servers, computers, or other hardware platforms of the system 100. The selection tool 124 may consist of one or more initiation modules, mass command modules, and/or selection modules according to an embodiment.

In the embodiment of FIG. 1, the server 180 is connected to the user device 120 by the network 160. The software application 122 and the selection tool 124 may be stored on the server 180 and are loaded, in whole or in part, to the user device 120 over the network 160 when the user 102 initiates or otherwise calls the software application 122. The software application 122 presents the graphical user interface on the user device 120. In other embodiments, the software application 122 may be loaded on a single computer instead of the system 100 or the software application 122 and/or the selection tool 124 may be stored in whole or in part on both the user device 120 and the server 180. The system 100 shown is only one possible implementation of the selection tool 124 in conjunction with the software application 122.

Figure 2:
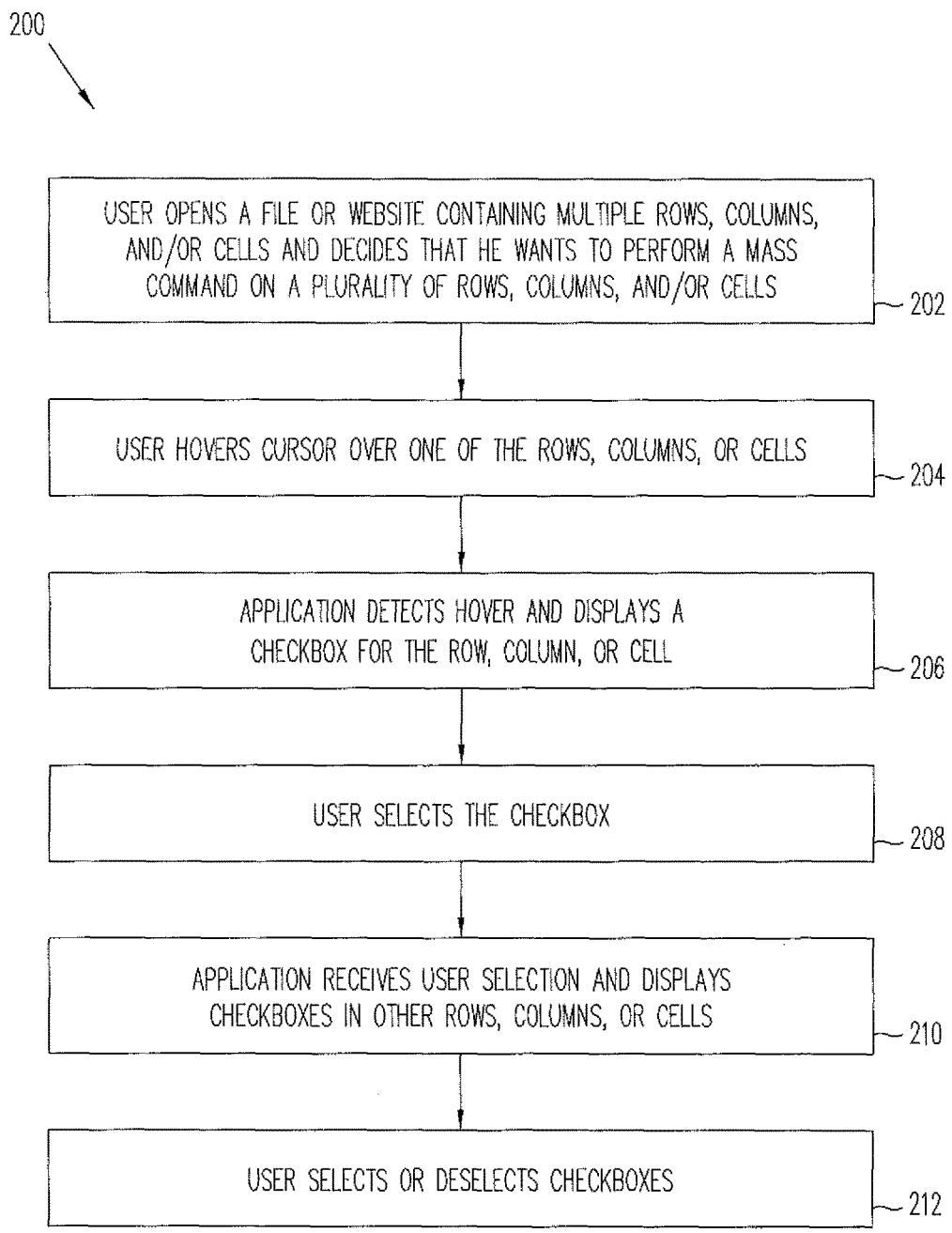
FIG. 2 is a flowchart showing a method for selecting multiple rows, columns, and/or cells according to an embodiment of the present disclosure.

Referring now to FIG. 2, a flowchart 200 of a method of selecting multiple rows, columns, and/or cells is illustrated according to an embodiment of the present disclosure. At step 202, the user 102 opens a file, document, or website containing multiple rows, columns, and/or cells and decides that he or she wants to perform a mass command on a plurality of rows, columns, and/or cells. The document may be, for example, in the form of a spreadsheet with a plurality of rows and columns such as a Microsoft Excel file, or a table in a Microsoft Word document. A cell is one grouping within the spreadsheet or table. Cells are typically grouped horizontally into rows and grouped vertically into columns.

In various examples, the user 102 may want to send multiple files, each file in a row, column, or cell, from a stage to a table, which involves the selection of multiple rows, columns, and/or cells and then hitting a "Send" button. The user 102 may want to disable multiple users, each user in a row, column, or cell, from an environment; force multiple users to reset their passwords; export multiple tables of data, the data arranged in rows, columns, and cells, out into separate .CSV (comma separated values) files; hibernate/delete/wake multiple servers, each server in a row, column, or cells, at the same time; or edit the properties of multiple servers at the same time.

At step 204, the user 102 hovers or moves a pointer or cursor over a particular row, column, or cell. The user 102 may also use his or her finger on a touch screen device to touch a specific row, column, or cell. In an embodiment, the user 102 uses a mouse to hover a screen pointer over a row, column, or cell. In various embodiments, when the cursor or pointer hovers on the row, column, or cell, contextual action buttons appear on the right side of the row, column, or cell. Contextual action buttons typically appear upon user interaction and offer a limited set of choices that are available in the current state, or context, of the application. Typically, the available choices are actions related to the selected object. Contextual action buttons limit the number of buttons on screen at any one time to reduce complexity.

At step 206, the software application 122 detects the hover and displays a single checkbox for that particular row, column, or cell. In one embodiment, the one checkbox is displayed on the left side of the row, column, or cell. If the user 102 keeps scanning the cursor or pointer over other rows, columns, or cells, a checkbox will appear in that row, column, or cell. Advantageously, the user 102 sees only one checkbox at a time, per row, column, or cell. This reduces the clutter and complexity of the user interface.

At step 208, the user 102 selects one checkbox in a row, column, or cell. At step 210, the software application 122 receives the user selection of the checkbox and displays the rest of the unselected checkboxes in the other rows, columns, or cells. In various embodiments, "Select All" and "Deselect All" buttons appear in a top-level location of the screen or display.

At step 212, the user 102 can select or deselect checkboxes to indicate what rows, columns, and/or cells he or she wants to perform an action on. For example, the user 102 may choose to delete, move, etc. the selected rows, columns, and/or cells.

Figure 3A:
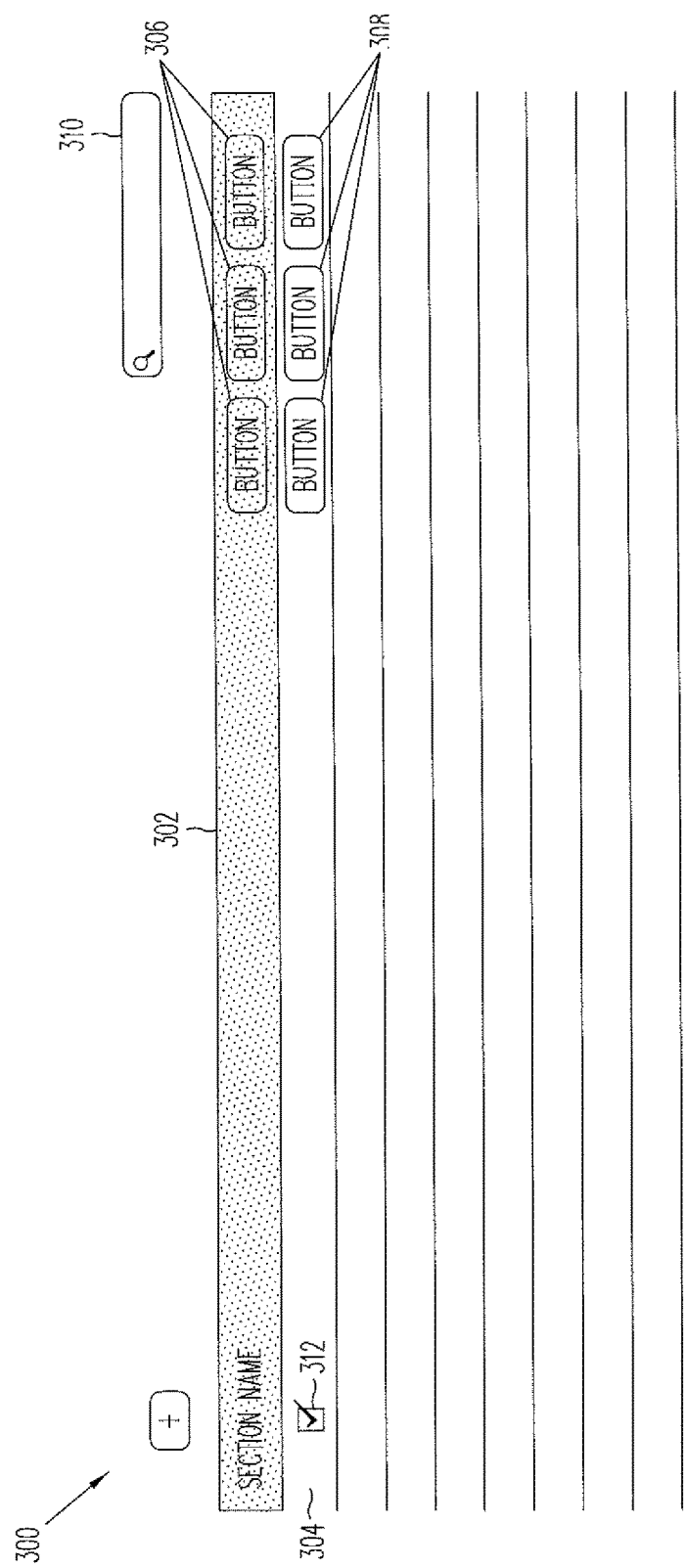
FIGS. 3A-3C are screenshots that illustrate a selection of multiple rows according to an embodiment of the present disclosure.
Figure 3B:
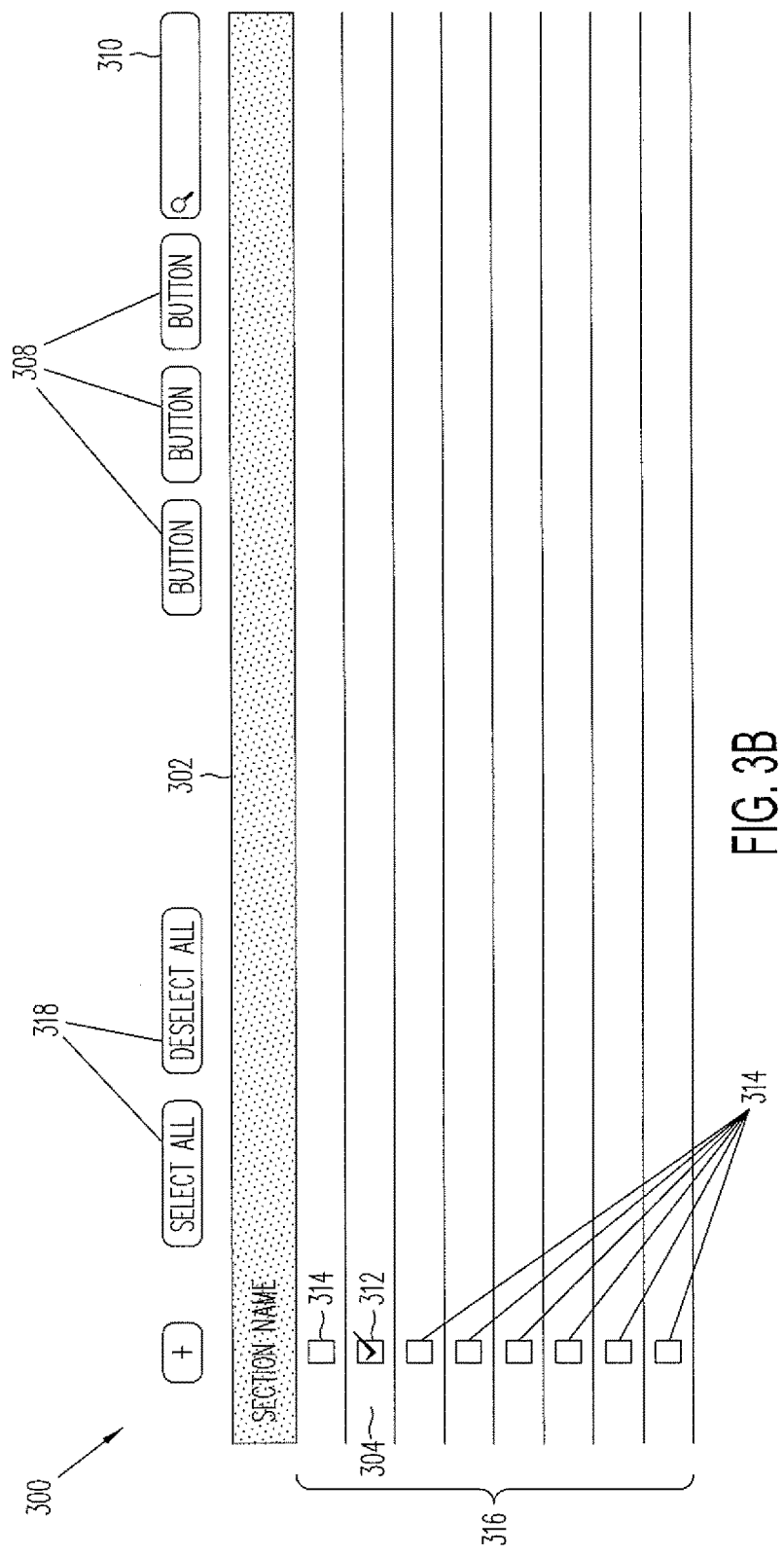
Figure 3C:
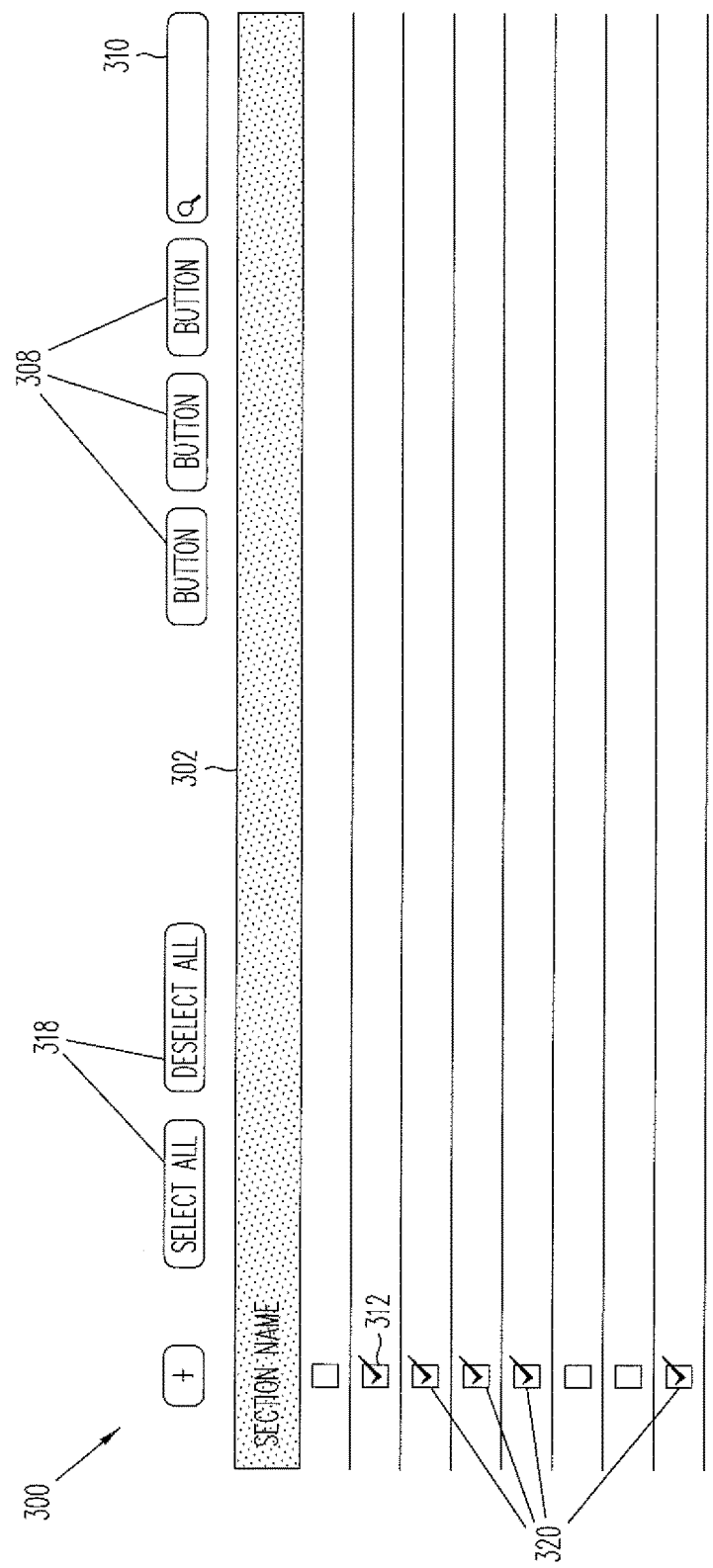

FIGS. 3A-3C are exemplary screenshots that show the different steps in method 200 when used to select multiple rows. The user 102 can hover or move a cursor over a particular part of the screen, e.g., a particular row. As the user 102 hovers or moves the cursor over the row, the user 102 can be presented with contextual action buttons.

FIG. 3A is an exemplary screenshot 300 of a display or screen when the user 102 hovers a pointer or cursor over a header 302 and when the user 102 hovers a pointer or cursor over a row 304. When the user 102 hovers a cursor over the header 302, contextual action buttons 306 appear in the header 302. On the other hand, when the user 102 hovers a cursor over the row 304, contextual action buttons 308 appear in the row 304. Contextual action buttons 306 and 308 are essentially the same buttons, except that contextual action buttons 306 appear contextually in the header 302, while contextual action buttons 308 appear in the row 304. As shown, the contextual action buttons 306 and 308 appear on a right side location of the header 302 and the row 304. A search field 310 for searching data can also be displayed in screenshot 300. In addition to contextual action buttons 308 appearing, a single checkbox 312 appears in row 304.

FIG. 3B illustrates an exemplary screenshot 300 of a display or screen when the user 102 selects the checkbox 312. A checkbox can be selected/deselected by clicking on the checkbox that is to be added or removed. Alternatively, a checkbox can be selected/deselected by using the arrow keys to select the checkbox and then pressing the return key. Once the user 102 checks the checkbox 312, all the unchecked checkboxes 314 appear in a checkbox column 316, and the contextual action buttons 308 move to a top level location of the screen or display. The checkbox column 316 facilitates the selection of rows. Control icons 318 are for selecting all or deselecting all the checkboxes in checkbox column 316. Control icons 318 are essentially the same type of buttons as contextual action buttons 306 and 308. The difference in the buttons 306, 308, and 318 is that they appear in different contextual locations. As shown, the "Select All" and "Deselect All" buttons 318 also appear at a top level location of the screen or display.

FIG. 3C illustrates an exemplary screenshot 300 of the display or screen when the user 102 selects more checkboxes 320. The user 102 can select/deselect checkboxes manually or use the "Select All/Deselect All" buttons 318. The user 102 who wants to perform a mass command or action on a plurality of rows may select the rows that are to be manipulated. These selected rows are indicated by a check in the checkbox for those rows.

Figure 4:
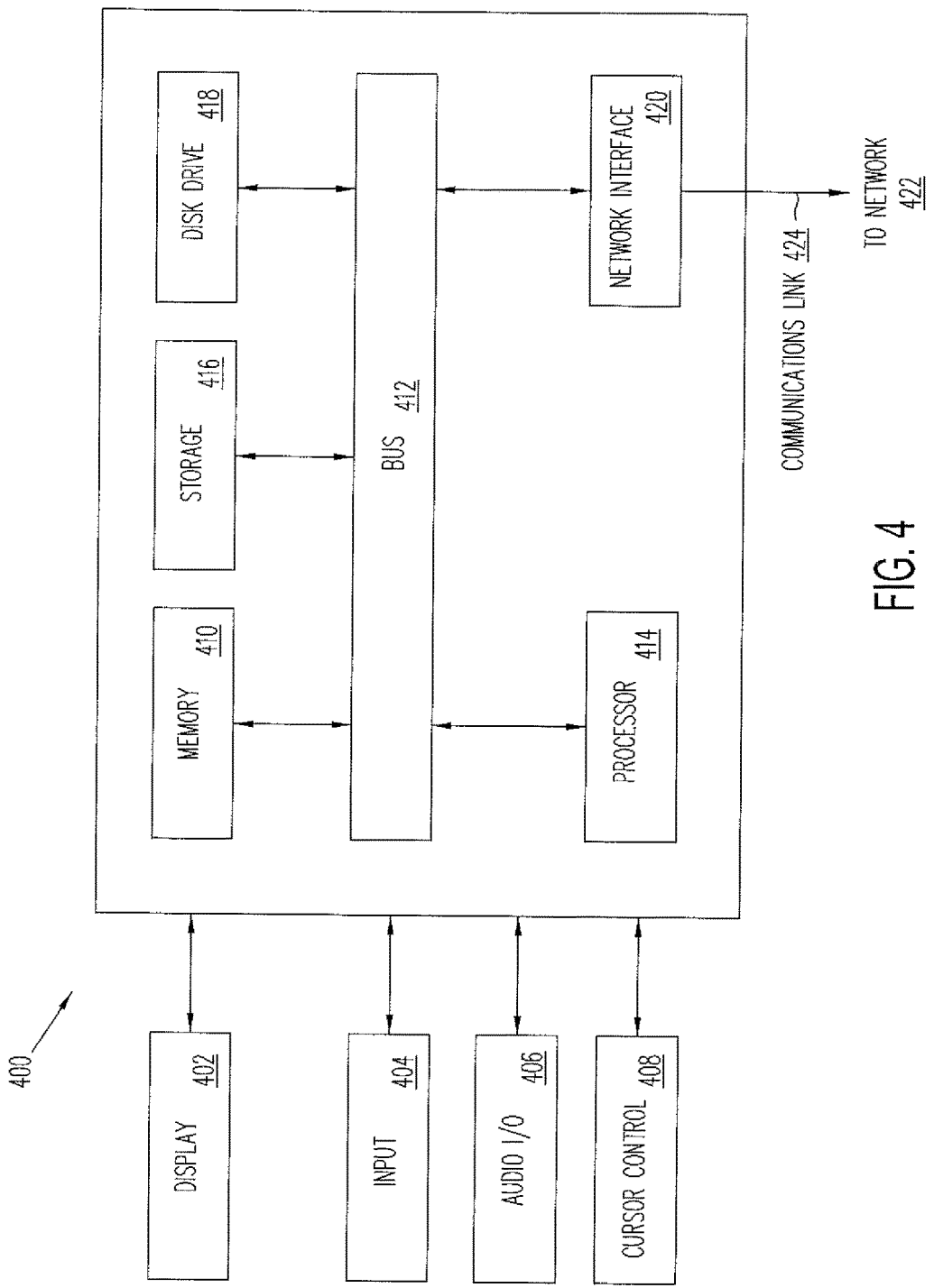
FIG. 4 is a block diagram of a system for implementing a device according to an embodiment of the present disclosure.

FIG. 4 is a block diagram of a computer system 400 suitable for implementing one or more embodiments of the present disclosure, including the user device 120 and the server 180. In various implementations, the user device 120 may comprise a mobile cellular phone, personal computer (PC), laptop, wearable computing device, etc. adapted for wireless communication, and the server 180 may comprise a network computing device, such as a server. Thus, it should be appreciated that the devices 120 and 180 may be implemented as computer system 400 in a manner as follows.

Computer system 400 includes a bus 412 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 412. I/O component 404 may also include an output component, such as a display 402 and a cursor control 408 (such as a keyboard, keypad, mouse, etc.). An optional audio input/output component 406 may also be included to allow a user to use voice for inputting information by converting audio signals. Audio I/O component 406 may allow the user to hear audio. A transceiver or network interface 420 transmits and receives signals between computer system 400 and other devices, such as another user device via network 422. In one embodiment, the transmission is wireless, although other transmission mediums and methods may also be suitable. A processor 414, which can be a micro-controller, digital signal processor (DSP), or other processing component, processes these various signals, such as for display on computer system 400 or transmission to other devices via a communication link 424. Processor 414 may also control transmission of information, such as cookies or IP addresses, to other devices.

Components of computer system 400 also include a system memory component 410 (e.g., RAM), a static storage component 416 (e.g., ROM), and/or a disk drive 418. Computer system 400 performs specific operations by processor 414 and other components by executing one or more sequences of instructions contained in system memory component 410. Logic may be encoded in a computer readable medium, which may refer to any medium that participates in providing instructions to processor 414 for execution. Such a medium may take many forms, including but not limited to, non-volatile media, volatile media, and transmission media. In various implementations, non-volatile media includes optical or magnetic disks, volatile media includes dynamic memory, such as system memory component 410, and transmission media includes coaxial cables, copper wire, and fiber optics, including wires that comprise bus 412. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a memory; and
one or more processors in communication with the memory and operable to:
cause to be displayed on a display or a touchscreen a list of a plurality of rows, columns, cells, or any combination thereof to a user;
responsive to a user hovering a cursor over a row, a column, or a cell in the list on the display or a user touching a row, a column, or a cell in the list on the touchscreen, cause to be displayed on the display or the touchscreen a checkbox in the row, the column, or the cell in the list and at least one contextual action button in the row, the column, or the cell; and
responsive to the user selecting the checkbox, cause to be displayed on the display or the touchscreen unselected checkboxes in other rows, columns, or cells in the list and to move the at least one contextual action button to a top level location of the display or the touchscreen, wherein the at least one moved contextual action button is adapted to perform a mass command action that manipulates all rows, columns, or cells in the list comprising selected checkboxes.

2. The system of claim 1, wherein the one or more processors are further operable to cause to be received a selection of checkboxes for a plurality of rows, columns, cells, or any combination thereof in the list.

3. The system of claim 2, wherein the one or more processors are further operable to perform a command on the selected plurality of rows, columns, cells, or any combination thereof.

4. The system of claim 1, wherein the at least one contextual action button is located on a right side of the row, the column, or the cell.

5. The system of claim 1, wherein each row in the plurality of rows, each column in the plurality of columns, or each cell in the plurality of cells, or any combination thereof, indicates an individual user, server, or file.

6. The system of claim 1, wherein the one or more processors are further operable to cause to be displayed on the display or the touchscreen a Select All button, a Deselect All button, or both when the user selects the checkbox.

7. The system of claim 1, wherein the one or more processors are further operable to cause to be displayed on the display or the touchscreen a plurality of contextual action buttons in a header when the user hovers the cursor over or touches the header.

8. A method for selecting multiple rows, columns, and/or cells, comprising:
    causing to be displayed on a display or a touchscreen, by one or more servers, a list of a plurality of rows, columns, or cells, or any combination thereof to a user;
    causing to be detected, by the one or more servers, that a cursor hovers over or that a user touches a row, a column, or a cell in the list on the display or the touchscreen;
    causing to be displayed on a display or a touchscreen, by the one or more servers, a checkbox in the row, column, or cell in the list and at least one contextual action button in the row, the column, or the cell;
    responsive to the user selecting the checkbox, causing to be displayed, by the one or more servers, unselected checkboxes in other rows, columns, or cells in the list and to move the at least one contextual action button to a top level location of the display or the touchscreen, wherein the at least one moved contextual action button is adapted to perform a mass command action that manipulates all rows, columns, or cells in the list comprising selected checkboxes; and
    causing to be received, by the one or more servers, a selection of the unselected checkboxes for a plurality of rows, columns, or cells in the list.

9. The method of claim 8, further comprising causing to be received the selection of the checkbox.

10. The method of claim 8, further comprising performing a command on the selected plurality of rows, columns, cells, or any combination thereof.

11. The method of claim 10, wherein the command comprises moving or deleting the selected plurality of rows, columns, cells, or any combination thereof.

12. The method of claim 10, further comprising causing to be displayed on the display or the touchscreen a Select All button, a Deselect All button, or both when the user selects the checkbox.

13. The method of claim 8, wherein each row in the plurality of rows, each column in the plurality of columns, each cell in the plurality of cells, or any combination thereof, indicates an individual user, server, or file.

14. The method of claim 8, further comprising causing to be displayed on the display or the touchscreen a plurality of contextual action buttons in a header when the user hovers the cursor over or touches the header.

15. A non-transitory machine-readable medium comprising instructions which, in response to a computer system, cause the computer system to perform a method comprising:
    causing to be displayed on a display or a touchscreen a list of a plurality of rows, columns, cells, or any combination thereof to a user;
    responsive to a user hovering a cursor over or the user touching a row, a column, or a cell in the list on the display or the touchscreen, causing to be displayed on the display or the touchscreen a checkbox in the row, column, or cell in the list and at least one contextual action button in the row, the column, or the cell; and
    responsive to the user selecting the checkbox, causing to be displayed on the display or the touchscreen unselected checkboxes in other rows, columns, or cells in the list and to move the at least one contextual action button to a top level location in the list of the display or the touchscreen, wherein the at least one moved contextual action button is adapted to perform a mass command action that manipulates all rows, columns, or cells in the list comprising selected checkboxes.

16. The non-transitory machine-readable medium of claim 15, wherein the method further comprises causing to be received a selection of checkboxes for a plurality of rows, columns, cells, or any combination thereof in the list.

17. The non-transitory machine-readable medium of claim 16, wherein the method further comprises performing a command on the selected plurality of rows, columns, cells, or any combination thereof.

18. The non-transitory machine-readable medium of claim 17, wherein the command comprises moving or deleting the selected plurality of rows, columns, cells, or any combination thereof.

19. The non-transitory machine-readable medium of claim 15, wherein each row in the plurality of rows, each column in the plurality of columns, each cell in the plurality of cells, or any combination thereof, indicates an individual user, server, or file.

20. The non-transitory machine-readable medium of claim 19, wherein the method further comprises causing to be displayed on the display or the touchscreen a Select All button, a Deselect All button, or both when the user selects the checkbox.

* * * * *